(No Model.)  2 Sheets—Sheet 1.
W. G. STONE.
DRYING APPARATUS.
No. 554,743. Patented Feb. 18, 1896.
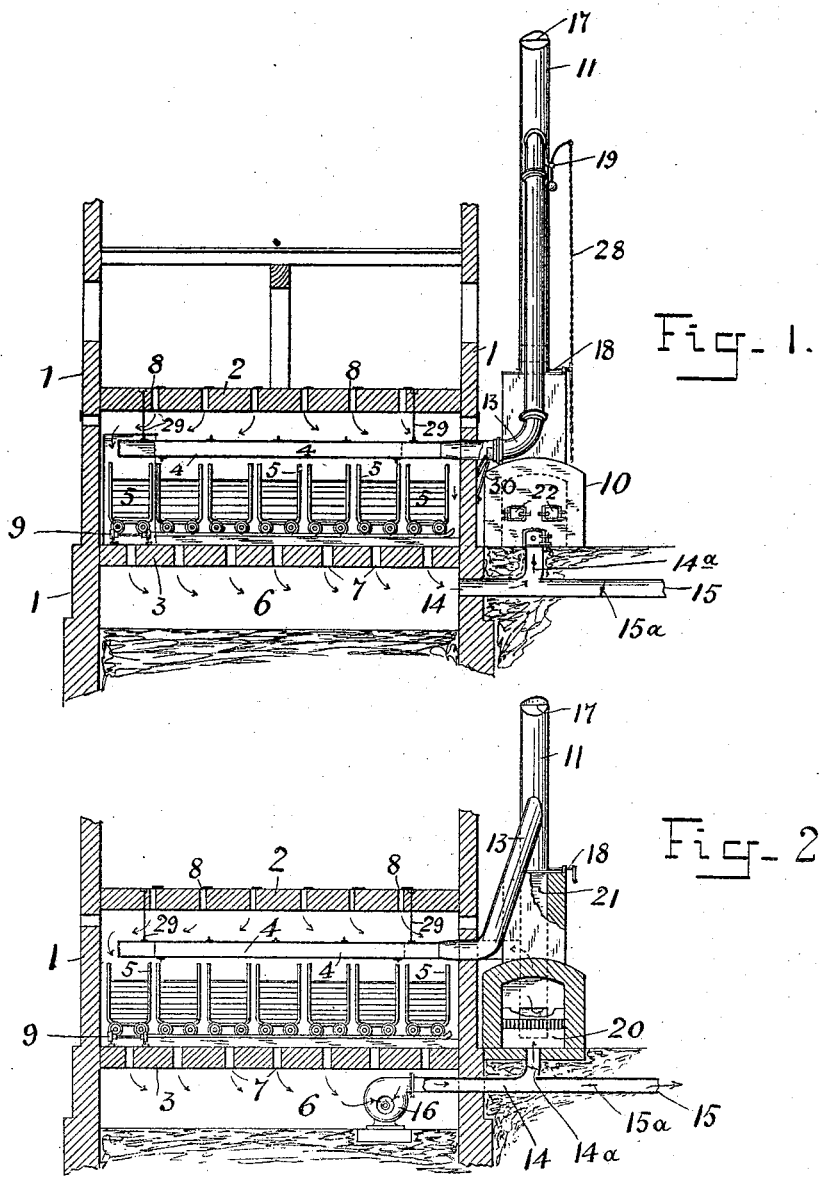
Witnesses
Chas. Hanimann
Jacob Newman
Inventor
William G. Stone
By his Attorney
F. Parker Smith

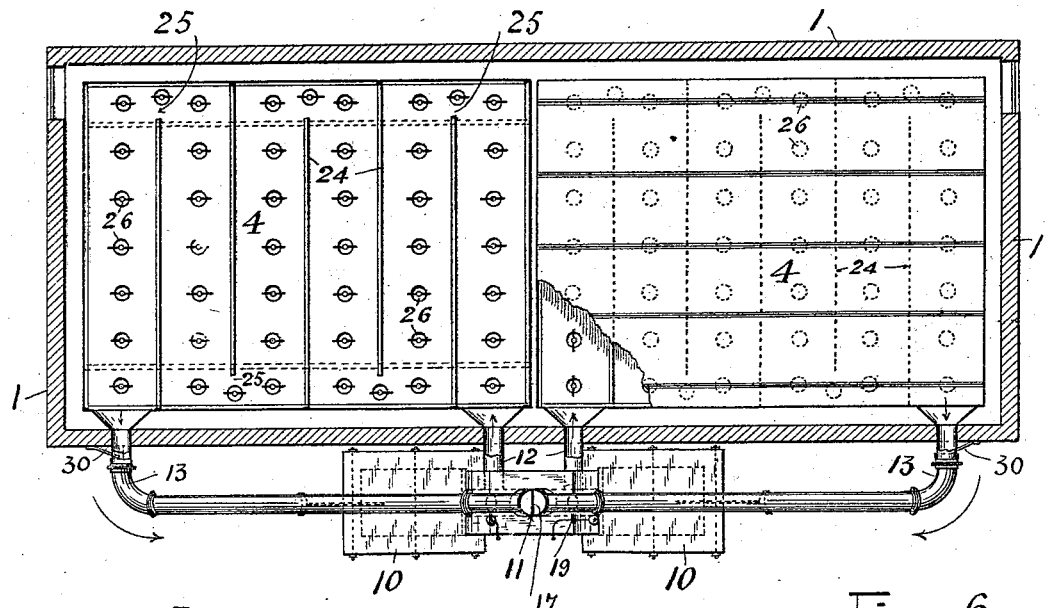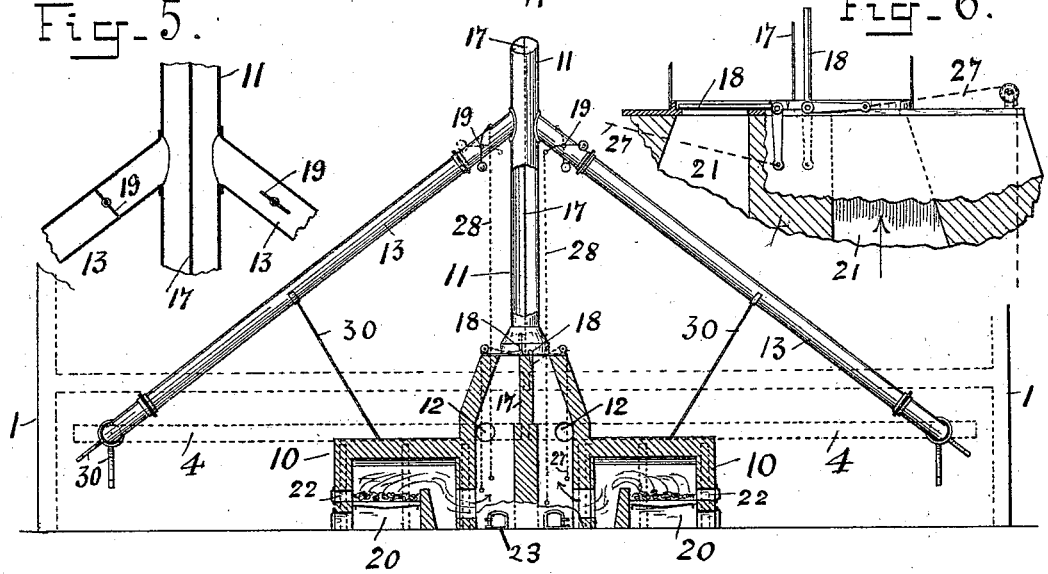

UNITED STATES PATENT OFFICE.

WILLIAM G. STONE, OF BROOKLYN, NEW YORK, ASSIGNOR TO THE H. W. JOHNS MANUFACTURING COMPANY, OF JERSEY CITY, NEW JERSEY.

DRYING APPARATUS.

SPECIFICATION forming part of Letters Patent No. 554,743, dated February 18, 1896.

Application filed November 9, 1895. Serial No. 568,449. (No model.)

*To all whom it may concern:*

Be it known that I, WILLIAM G. STONE, a citizen of the United States, residing at Brooklyn, in the county of Kings and State of New York, have invented certain new and useful Improvements in Apparatus for the Artificial Drying of Articles; and I do hereby declare the following to be a full, clear, and exact description of the invention, such as will enable others skilled in the art to which it appertains to make and use the same.

My invention consists of an improvement in apparatus for the rapid artificial drying of articles, and has for its object the production of an apparatus which shall cause and permit the passage of the largest possible amount of highly-heated air through the drying-room and combine therewith the utilization of the radiant heat to the highest possible degree, said apparatus to be capable of exact regulation throughout a wide range of temperature and to combine the advantages of small first cost of plant and a high degree of economy in the utilization of the heat produced.

Heretofore the different kinds of apparatus for this purpose have been mainly of two classes—those in which the heating is done directly or indirectly by steam-coils and those in which the gases of combustion are passed through the chamber in which the articles to be dried are placed.

The first method is uneconomical, as the entire heat of the steam represents but a small fraction of the heat of the coal burned in the furnace, and the second can only be used in certain cases, because certain of the gases of combustion and other substances carried over from the furnace are injurious to many articles when brought in direct contact with them in the process of drying.

My invention avoids the disadvantages and combines the advantage of both these classes of construction. It further combines the two methods of applying heat, by radiation and by convection, and is capable of exact regulation in the comparative extent of employment of these two methods and in the degree of temperature obtained.

The apparatus is easily cleaned and highly efficient in its operation. The preferred form is illustrated in the accompanying drawings, in which—

Figure 1 is a vertical section of an apparatus embodying my invention. Fig. 2 is a vertical section of a slightly different apparatus embodying my invention with an additional detail. Fig. 3 is a plan view of the drying-room and furnaces, showing the platens with their connections, the walls of the drying-room being shown in section. Fig. 4 is a vertical section and elevation showing the furnaces and smoke-stack connections. Fig. 5 is a detail of the smoke-stack connections and valves. Fig. 6 is a detail of the valves connecting the furnaces directly with the smoke-stack.

Throughout the drawings like reference-figures refer to like parts.

1 represents the walls of a building which contains the drying-room. 2 is the ceiling, and 3 is the floor of said drying-room, which is formed by the walls of the building 1 and such ceiling and floor.

4 is a hollow platen, which may be made in several parts, each constituting a separate platen, where a large amount of ground is covered by the drying-room and the use of a single platen would result in an unwieldy construction. Two such platens are shown in the plan view, Fig. 3.

The single platen, if only one is used, or the several platens taken together, if more than one are used, are arranged adjacent to and nearly cover the ceiling of the room, as shown.

5 5 are cars on which the articles to be dried are placed for introduction into and withdrawal from the drying-room. These cars stand on rails (indicated in Figs. 1 and 2) and can be transferred to a truck 9 (shown in said figures) which runs upon rails at right angles to the first-mentioned sets of rails and can thus be placed opposite to any one of said first-mentioned sets of rails for the purpose of delivering a car thereto or receiving it therefrom.

6 is an inclosed space or conduit, or series of conduits, beneath the floor 3 of the drying-room and connected with said drying-room by one or more openings 7. There are one or more openings 8 in the ceiling 2 of said drying-room or in the upper portion of the walls of said drying-room adjacent to said ceilings and above the level of the platen 4.

10 is a furnace or series of furnaces, two being shown in the drawings, which furnish the heat for the drying-room. 11 is the smoke-stack or smoke-stacks of said furnace or series of furnaces.

12 is the connection from each platen to the combustion-chamber of its corresponding furnace.

13 is the connection from another portion of each platen to the smoke-stack of its corresponding furnace.

14 is a connection from the open space or conduit 6 beneath the floor of the drying-room to the ash-pit 20 of the furnace. This connection is controlled by the valve 14$^a$. 15 is a branch connection from such space or conduit to the atmosphere controlled by the valve 15$^a$.

16 is an exhaust-fan located in or connected with the space or conduit 6 and delivering into the connection 14, as in the construction illustrated in Fig. 2.

17 is a partition extending up from the furnaces into the smoke-stack 11 when two furnaces are placed together, as shown in Figs. 3 and 4, and forming two separate compartments in said stack, into which the pipe connections 13 13 from the respective platens open. 18 18 are valves controlling the connection between said compartments of the stack and the combustion-chambers 21 21 of the respective furnaces.

19 19 are valves controlling the respective pipes 13 13 delivering into the stack.

22 22 are the ordinary furnace-doors through which the fuel is charged.

23 23 are doors opening into the bottom of the stack, through which soot and other impurities carried over from the combustion-chambers of the furnaces and deposited can be removed.

27 is one of the chains by which the valves 18 18 are operated, and 28 is a similar chain by which one of the valves 19 19 may be operated.

The platen or platens 4 4 are divided into separate sections by partitions 24 24, &c. These partitions are preferably vertical or approximately vertical and have openings or cut-away portions 25 25, &c., in their opposite ends, so that they divide the interior space of said platen into a series of sections through which the hot air from the furnaces must pass longitudinally in going from the furnace connection 12 to the stack connection 13.

26 26, &c., are a series of openings, having suitable covers, in the bottom of each platen. These openings serve the double purpose of giving access to the interior of each platen, for the purpose of cleaning the same, and of permitting the products of combustion to be drawn down into the drying-room, if it should be desired.

29 29 are hangers supporting the platens from the ceiling 2, and 30 30 are braces supporting the pipes 13 13.

In Fig. 3 the left-hand platen is shown in section, while the right-hand platen is shown in plan view with a small portion of its top broken away in one corner.

The mode of operation of my invention is as follows: Fires being built in the furnaces 10 the hot gases of combustion pass over into the stack 11, the valves 18 being open and the valves 19 being closed. When the fires are under headway, the valves 18 are closed and the hot gases pass through the connections 12 into the platens 4 and through the various sections in said platens. If the valves 19 are open, as is the case in the usual mode of operation of my invention, the hot gases pass out of the platens through the pipes 13 and up the stack. The natural draft thus created in the furnaces will draw a current of air down through the openings 8 in the ceiling of the drying-room, over the platen 4, down through the drying-room, out through the outlets 7 in the floor 3 into the space or conduit 6, and through the connection 14 into the ash-pit 20 of each furnace, the valve 14$^a$ being open and the valve 15$^a$ being closed. I prefer, however, to employ an exhaust-fan 16, as shown in Fig. 2, which will insure a greater draft down through the drying-room and will discharge all or a portion of such air into the atmosphere direct through the connection 15 after it has done its work in removing the moisture from the articles in the drying-room. By opening the valve 14$^a$ to a greater or less extent the draft necessary to produce combustion in the premises can be artificially augmented and the height of the smoke-stack 11 reduced. This will also remove a part of the necessity for having the gases in said stack of a high temperature, and thus render it possible to have them give up a greater portion of their heat to the drying-room before entering the stack. If desired, the inlets 8 in the ceiling can be closed wholly or in part and certain of the covers removed from the openings 24 in the bottom of the platen nearest to the connection 13, and in that case the fan will draw the products of combustion from the platen directly into and through the drying-room. In this case the valves 18 and 19 should both be closed. When fresh fuel is being charged into the furnace, under whatever method of operation, I close the valve 19 and open the valve 18, so that the heavy black smoke and soot produced by such charging are delivered directly up the stack, and the necessity for cleaning out the platens thereby become less frequent.

The advantages of my invention consist primarily of the fact that the platen through which the hot gases pass heats the room directly by radiation down from the under surface of the platen and indirectly by convection through the air which is drawn down upon its upper surface and becomes highly heated thereby before it passes on down into the drying-room.

Further advantages arise from the fact that the apparatus can be operated entirely with fresh air passing down through the inlets 8, all the products of combustion, with their possible deleterious constituents, passing through the platen and up the stack, or it may be operated wholly or in part with such products of combustion by admitting them to the drying-room through the openings in the bottom of the platen when the articles to be dried are of such nature as to be uninjured by the gases.

It is evident also that the apparatus is capable of being operated either by natural draft or forced draft, that by these and other variations the temperature of the drying-room and the quantity of air drawn through it can be nicely regulated, and that the highest degree of efficiency results from compelling the products of combustion to give up their heat to the fullest degree through the joint employment of radiation from a large surface and the convection of heat by a large volume of air thoroughly heated by passing over a correspondingly large surface of the platen, which would otherwise be dead so far as any heating effects upon the drying-room is concerned.

It is evident that various changes could be made in the details and arrangement of parts of my apparatus without departing from the principle of operation as here set out and without departing from the spirit and scope of my invention. The platens could be arranged along one vertical wall of the drying-room, so long as the air-inlets were back of it and the air-outlets were in the opposite wall; but this will be a much less efficient construction. The furnaces and smoke-stacks might be variously arranged and the exhaust-fan located outside of the building, so long as it had proper connection for sucking the air through the outlets 7.

It is evident that the partitions in the platen might be differently disposed, so long as they are parallel to the least dimension thereof. To secure the best results the platen should nearly cover the ceiling or wall of the room near which it is located and conform to the boundaries thereof in its outlines. Its thickness should be about eighteen inches in ordinary cases. This thickness is the least dimension of the platen, and the partitions should be parallel to that, in order that the hot gases passing through should always be in contact with the two principal surfaces—the upper and lower faces—of the platen.

Having therefore described my invention, what I claim as new, and desire to protect by Letters Patent, is—

1. In a drying apparatus the combination of the drying-room, the hollow platen which is arranged adjacent to and nearly covers the ceiling of the drying-room, the air-inlets through or adjacent to the said ceiling, the air-outlets through or adjacent to the floor of said room, means for causing an inflow of air through said inlets and an outflow through said outlets, the furnace, and connections from said furnace to the before-mentioned hollow platen whereby the products of combustion in said furnace may pass into said platen, substantially as described.

2. In a drying apparatus, the combination of the drying-room, the hollow platen which is arranged adjacent to and nearly covers the ceiling of the room, the air-inlets through or adjacent to said ceiling, the air-outlets through or adjacent to the floor of said room, means for causing an inflow of air through said inlets and an outflow through said outlets, the furnace and smoke-stack, and connections from said furnace and said smoke-stack to the before-mentioned hollow platen, whereby the products of combustion in said furnace are passed through said platen before entering the smoke-stack, substantially as described.

3. In a drying apparatus, the combination of the drying-room, the hollow platen which is arranged adjacent to and nearly covers the ceiling of the room, the air-inlets through or adjacent to said ceiling, the air-outlets through or adjacent to the floor of said room, means for causing an inflow of air through said inlets and an outflow through said outlets, the furnace and smoke-stack, and connections from said furnace and said smoke-stack to the before-mentioned hollow platen, whereby the products of combustion in said furnace are passed through said platen before entering the smoke-stack, together with a by-pass direct from the furnace to the stack, and valves controlling said by-pass and the before-mentioned connections, substantially as described.

4. In a drying apparatus the combination of the drying-room, the hollow platen which is arranged adjacent to the ceiling of the drying-room, the air-outlets through or adjacent to the floor of said room, and an exhaust-fan connected to said outlets, the furnace, and connections from the combustion-chamber of said furnace to the before-mentioned hollow platen, substantially as described.

5. In a drying apparatus the combination of the drying-room, the hollow platen which is arranged adjacent to the ceiling of said drying-room, the air-inlets through or adjacent to the ceiling of said room, the air-outlets through or adjacent to the floor of said room, the furnace and smoke-stack, and connections from said air-outlets to the ash-pit of the furnace, from the combustion-chamber of the furnace to the hollow platen, and from the hollow platen to the smoke-stack, substantially as described.

6. In a drying apparatus the combination of the drying-room, the hollow platen which is arranged adjacent to the ceiling of said drying-room, the air-inlets through or adjacent to the ceiling of said room, the air-outlets through or adjacent to the floor of said room, the furnace and smoke-stack, and connections from said air-outlets and the ash-pit of the furnace, from the combustion-chamber of the furnace to the hollow platen, and from the hollow platen to the smoke-stack, together with a fan which forces the air through the inlets and outlets of the drying-room and into the ash-pit of the furnace, substantially as described.

7. In a drying apparatus, the combination of the drying-room, the hollow platen which is arranged adjacent to and nearly covers the ceiling of the room, the air-inlets through or adjacent to said ceiling, the air-outlets through or adjacent to the floor of said room, means for causing an inflow of air through said inlets and an outflow through said outlets, the furnace and smoke-stack, and connections from said furnace and said smoke-stack, to the before-mentioned hollow platen, whereby the products of combustion in said furnace are passed through said platen before entering the smoke-stack, together with a series of partitions in said platen so arranged that the products of combustion are compelled to pass through each several section of the platen in going from the mouth of the furnace connection to the mouth of the smoke-stack connection, substantially as described.

8. In a drying apparatus the combination of the drying-room, the hollow platen which is arranged adjacent to and nearly covers the ceiling of the drying-room, the air-inlets through or adjacent to the said ceiling, the air-outlets through or adjacent to the floor of said room, means for causing an inflow of air from the said inlets and an outflow through said outlets, the furnace, and connections from said furnace to the before-mentioned hollow platen whereby the products of combustion in said furnace may pass into said platen, together with vertical partitions in said platen which are so arranged as to divide its interior into two or more separate sections which are connected one to another in series, and a series of openings in the bottom of said platen with covers for the same, substantially as described.

9. A hollow platen for heating a drying-room which nearly covers the ceiling of the room and has several partitions parallel with its least dimension, openings through these partitions at opposite ends thereof, whereby they are connected in series, and a series of openings in the under side of the platen disposed along the sections formed by the above-mentioned partitions, removable covers for said last-mentioned openings, and means for connection from opposite ends of the series of sections, above described, to heat and draft producing apparatus, substantially as described.

In testimony whereof I affix my signature in presence of two witnesses.

WILLIAM G. STONE.

Witnesses:
F. L. EVANS,
A. PARKER SMITH.